(12) United States Patent
Lester et al.

(10) Patent No.: US 10,756,905 B2
(45) Date of Patent: *Aug. 25, 2020

(54) SYSTEM AND METHOD OF CRYPTOGRAPHICALLY SIGNING WEB APPLICATIONS

(71) Applicant: Cyph, Inc., Dover, DE (US)

(72) Inventors: Ryan Lester, Dover, DE (US); Jann Horn, Oldenburg (DE); Bryant Zadegan, Dover, DE (US)

(73) Assignee: Cyph, Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,876

(22) Filed: Oct. 5, 2018

(65) Prior Publication Data

US 2019/0305961 A1    Oct. 3, 2019

Related U.S. Application Data

(63) Continuation of application No. 15/673,884, filed on Aug. 10, 2017, now Pat. No. 10,097,357, which is a (Continued)

(51) Int. Cl.
*H04L 9/32* (2006.01)
*H04L 29/08* (2006.01)
(Continued)

(52) U.S. Cl.
CPC .............. *H04L 9/3247* (2013.01); *G06F 8/60* (2013.01); *G06F 21/606* (2013.01); *H04L 5/0037* (2013.01); *H04L 9/0861* (2013.01); *H04L 9/321* (2013.01); *H04L 9/3215* (2013.01); *H04L 9/3271* (2013.01); *H04L 51/16* (2013.01);
(Continued)

(58) Field of Classification Search
CPC . H04L 9/3247; H04L 9/3271; H04L 63/0442; H04L 67/146; H04L 67/141; H04L 67/10; H04L 63/18; H04L 63/0838; H04L 63/08; H04L 63/065; H04L 63/061; H04L 63/0435; H04L 63/0281; H04L 51/16; H04L 9/3215; H04L 9/321; H04L 9/0861; H04L 5/0037; H04L 67/02;
(Continued)

(56) References Cited

U.S. PATENT DOCUMENTS 6,629,150 B1 *  9/2003  Huded .................... G06F 21/64
                                                707/999.004
7,085,926 B1 *  8/2006  Peach .................... G06Q 20/00
                                                705/64
(Continued)

*Primary Examiner* — Darren B Schwartz
(74) *Attorney, Agent, or Firm* — Brundidge & Stanger, P.C.

(57) ABSTRACT

Embodiments disclosed herein provide a method that includes receiving, at a client-side web browser, a minimal bootstrap payload from an application server; storing, by a client-side processor, the minimal bootstrap payload in a client-side local cache, where the locally cached minimal bootstrap payload is executed by the client-side processor before executing an application from the application server; the minimal bootstrap payload includes at least one public key and at least one Uniform Resource Location (URL) address of an application code payload.

16 Claims, 4 Drawing Sheets

Related U.S. Application Data continuation of application No. 15/001,015, filed on Jan. 19, 2016, now Pat. No. 9,906,369, which is a continuation of application No. PCT/US2015/047788, filed on Aug. 31, 2015.

(60) Provisional application No. 62/104,307, filed on Jan. 16, 2015, provisional application No. 62/104,307, filed on Jan. 16, 2015.

(51) Int. Cl.
    *H04L 29/06*     (2006.01)
    *H04L 12/58*     (2006.01)
    *H04W 12/10*     (2009.01)
    *H04L 5/00*     (2006.01)
    *G06F 21/60*     (2013.01)
    *G06F 8/60*     (2018.01)
    *H04L 9/08*     (2006.01)

(52) U.S. Cl.
    CPC ...... *H04L 63/0281* (2013.01); *H04L 63/0435* (2013.01); *H04L 63/0442* (2013.01); *H04L 63/061* (2013.01); *H04L 63/065* (2013.01); *H04L 63/08* (2013.01); *H04L 63/0838* (2013.01); *H04L 63/123* (2013.01); *H04L 63/18* (2013.01); *H04L 67/02* (2013.01); *H04L 67/10* (2013.01); *H04L 67/141* (2013.01); *H04L 67/146* (2013.01); *H04W 12/10* (2013.01); *H04L 67/42* (2013.01)

(58) Field of Classification Search
    CPC ...... H04L 63/123; H04L 67/42; H04W 12/10; G06F 21/606; G06F 8/60
    See application file for complete search history.

(56) References Cited

U.S. PATENT DOCUMENTS

| | | | | |
|---|---|---|---|---|
| 2002/0040431 A1* | 4/2002 | Kato | ................... | G06F 21/6209 713/168 |
| 2002/0053024 A1* | 5/2002 | Hashimoto | ........... | G06F 21/125 713/168 |
| 2003/0028363 A1* | 2/2003 | Nobili | ................. | G06F 9/54 704/1 |
| 2003/0196087 A1* | 10/2003 | Stringer | .............. | G06F 21/6209 713/171 |
| 2004/0059735 A1* | 3/2004 | Gold | .................... | G06F 11/2025 |
| 2004/0194027 A1* | 9/2004 | Suzuki | .................. | G06F 17/218 715/209 |
| 2005/0160045 A1* | 7/2005 | Watanabe | ............... | G06F 21/53 705/51 |
| 2005/0251677 A1* | 11/2005 | Maeda | ....................... | G06F 8/61 713/165 |
| 2006/0230272 A1* | 10/2006 | Lawrence | ............. | H04L 63/126 713/176 |
| 2007/0136361 A1* | 6/2007 | Lee | .......................... | G06F 21/64 |
| 2007/0136579 A1* | 6/2007 | Levy | .................... | H04L 63/102 713/168 |
| 2011/0289560 A1* | 11/2011 | Laitinen | ................ | H04L 9/3273 726/4 |
| 2012/0124567 A1* | 5/2012 | Landry | ............... | G06F 11/1433 717/168 |
| 2012/0131143 A1* | 5/2012 | Nakazawa | ........... | H04L 9/3247 709/218 |
| 2013/0080785 A1* | 3/2013 | Ruhlen | .................... | H04L 67/16 713/176 |
| 2013/0185548 A1* | 7/2013 | Djabarov | ............. | G06F 21/572 713/2 |
| 2013/0185563 A1* | 7/2013 | Djabarov | ................ | G06F 8/654 713/176 |
| 2013/0238970 A1* | 9/2013 | Getzin | .................. | G06F 16/958 715/234 |
| 2013/0322451 A1* | 12/2013 | Wang | ...................... | H04L 45/306 370/392 |
| 2014/0040873 A1* | 2/2014 | Goldman | .................. | G06F 8/65 717/168 |
| 2014/0052993 A1* | 2/2014 | Isozaki | ............... | H04L 63/0428 713/175 |
| 2014/0108810 A1* | 4/2014 | Chenna | ................... | H04L 9/321 713/179 |
| 2015/0205950 A1* | 7/2015 | Vayvod | ............... | G06F 9/44505 726/30 |
| 2016/0182563 A1* | 6/2016 | Sambandam | ......... | H04L 63/123 726/22 |
| 2016/0373462 A1* | 12/2016 | Wang | ...................... | G06F 21/64 |

* cited by examiner

SYSTEM AND METHOD OF CRYPTOGRAPHICALLY SIGNING WEB APPLICATIONS

CROSS-REFERENCE TO RELATED APPLICATIONS

This application is a Continuation of U.S. Ser. No. 15/673,884, filed Aug. 10, 2017; which is a Continuation of U.S. Ser. No. 15/001,015, filed Jan. 19, 2016, now U.S. Pat. No. 9,906,369; which is a Continuation of International Application No.: PCT/US15/47788, filed Aug. 31, 2015; which claims priority to U.S. Provisional Application No. 62/104,307, entitled "SYSTEM AND METHOD OF CRYPTOGRAPHICALLY SIGNING WEB APPLICATIONS" and filed Jan. 16, 2015; and further claims priority to U.S. Non-Provisional application Ser. No. 15/001,015, entitled "SYSTEM AND METHOD OF CRYPTOGRAPHICALLY SIGNING WEB APPLICATIONS" and filed Jan. 19, 2016.

The subject matter of the present application is related to that disclosed in the following co-pending applications:

Ser. No. 14/841,327, entitled "CROSS-CLIENT COMMUNICATION METHOD" and filed Aug. 31, 2015 and claiming priority to U.S. Provisional Application No. 62/100,674, filed on Jan. 7, 2015;

Ser. No. 14/841,318, entitled "CRYPTOGRAPHIC METHOD FOR SECURE COMMUNICATIONS" and filed Aug. 31, 2015 and claiming priority to U.S. Provisional Application No. 62/100,676, filed on Jan. 7, 2015;

Ser. No. 14/841,313, entitled "METHOD OF DENIABLE ENCRYPTED COMMUNICATIONS" and filed Aug. 31, 2015 and claiming priority to U.S. Provisional Application No. 62/100,682, filed on Jan. 7, 2015;

Ser. No. 14/841,281, entitled "ENCRYPTED GROUP COMMUNICATION METHOD" and filed Aug. 31, 2015 and claiming priority to U.S. Provisional Application No. 62/100,684, filed on Jan. 7, 2015;

Ser. No. 14/841,310, entitled "METHOD OF GENERATING A DENIABLE ENCRYPTED COMMUNICATIONS VIA PASSWORD ENTRY" and filed Aug. 31, 2015 and claiming priority to U.S. Provisional Application No. 62/100,686, filed on Jan. 7, 2015;

Ser. No. 14/841,288, entitled "MULTI-KEY ENCRYPTION METHOD" and filed Aug. 31, 2015 and claiming priority to U.S. Provisional Application No. 62/100,688, filed on Jan. 7, 2015;

Ser. No. 14/841,302, entitled "METHOD OF EPHEMERAL ENCRYPTED COMMUNICATIONS" and filed Aug. 31, 2015 and claiming priority to U.S. Provisional Application No. 62/100,689, filed on Jan. 7, 2015;

Ser. No. 14/841,292, entitled "METHOD OF MULTI-FACTOR AUTHENTICATION DURING ENCRYPTED COMMUNICATIONS" and filed Aug. 31, 2015 and claiming priority to U.S. Provisional Application No. 62/100,692, filed on Jan. 7, 2015; and Ser. No. 14/841,296, entitled "METHOD OF USING SYMMETRIC CRYPTOGRAPHY FOR BOTH DATA ENCRYPTION AND SIGN-ON AUTHENTICATION" and filed Aug. 31, 2015 and claiming priority to U.S. Provisional Application No. 62/100,693, filed on Jan. 7, 2015.

The content of the above applications are incorporated by reference in their entirety.

BACKGROUND

Technical Field

The embodiments herein generally relate to cryptography, and, more particularly, to a system and method of cryptographically signing web applications.

Description of the Related Art

Applications delivered through the Internet and executed with in a user's Internet browser ("browser") are becoming increasing common on the Internet. Often, such applications involve sensitive user information and may include, for example, credential information, payment information, and/or personal account management information. For these and other reasons, it is often desirous to verify that the application is an authentic copy and has not been tampered with in any way. For example, sensitive user information could be severely compromised by a malicious entity by modify an application to obtain sensitive user information and/or information from the user's computer or computer network. Moreover, when such a malicious entity tampers with the application delivered through the Internet, the malicious entity may also be capable of tampering with the user's computer or other computers on the computer network.

To protect sensitive information, conventional methods often employ a challenge-response methodology, where, for example, an application directs a user's browser to send an encrypted message that proves the user knows some sensitive information (e.g., a password) without transmitting this required sensitive information.

The difficulties of such conventional methods for applications delivered over the Internet and executed on a user's browser, however, are numerous and publicly known. For example, when a challenge-response method relies secret information to create an encrypted message and the secret information is publicly known, the entire encryption system becomes compromised and must be revised (e.g., resetting passwords, passphrases, private keys, etc.). Since various methods to obtain this secret information are well known and frequently use—techniques such as such as man-in-the-middle attacks, social engineering—it is therefore desirable to reduce exposure to an encryption system's private information when communication within a group and thereby reducing the potential attack surface employing such an encryption system.

Additionally, as noted above, the application itself may have been tampered with and therefore not an authenticate copy. Conventional methods, such as the challenge-response methodology, do not address such a situation and, significantly worse, create the illusion of a secure environment. It is therefore desirable to reduce exposure to an encryption system's private information and verify that an application obtained from the Internet and executed within a user's browser is an authentic copy of that application.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
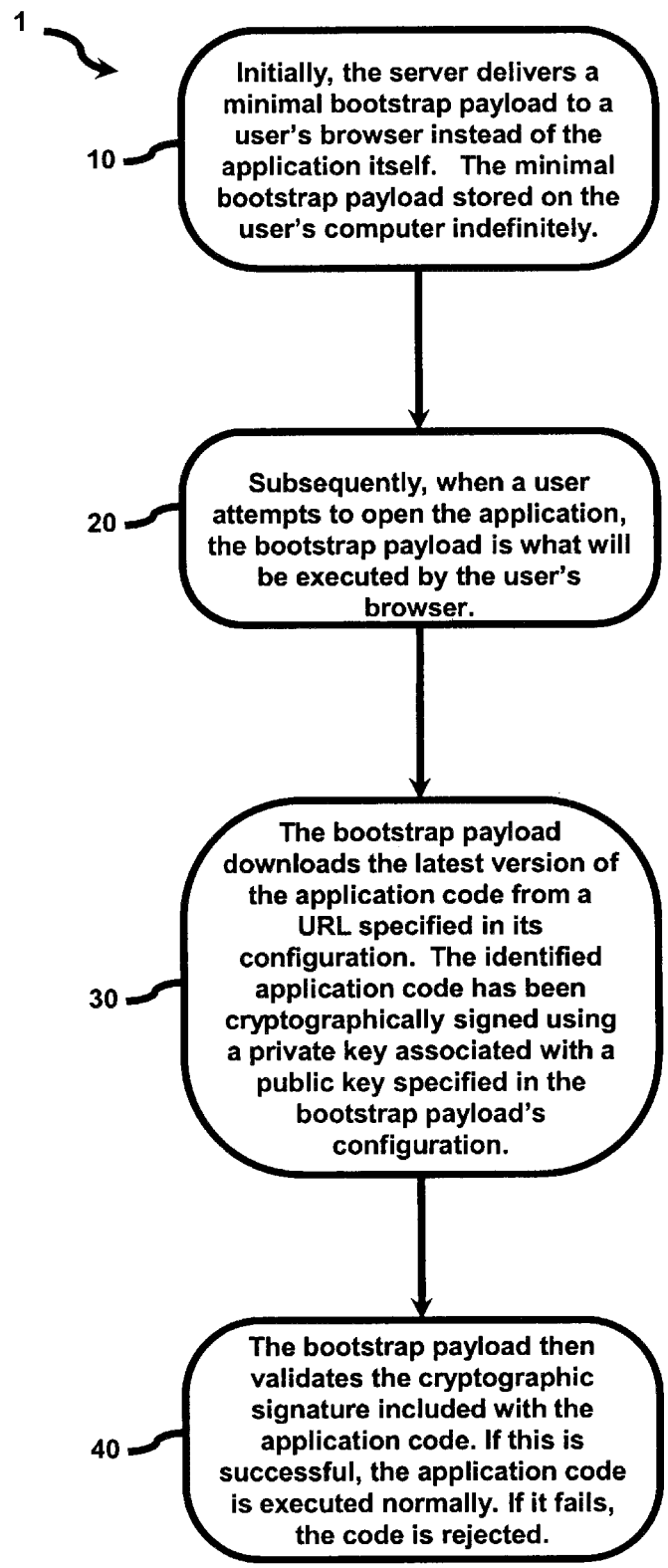
FIGS. 1A and 1B illustrate a flow diagram illustrating a method of cryptographically signing web applications according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a method of cryptographically signing web applications. For example, a user (e.g., "Alice") of an encrypted communication system (e.g., the Cyph™ secure messaging platform) would like to use the encrypted communication system on a web browser to engage another user to the system (e.g., "Bob") in encrypted communication. Using conventional methods, it is not possible for Alice to verify that this application has not been tampered with. For example, according to conventional systems, Alice's browser automatically downloads the latest copy of the application code from the server every time she navigates to the applications web address. Thus, according to conventional systems, very little security prevents a dedicated attacker from breaking into the application's server to tamper with the source code (e.g., publish the secret information of a cryptographic system or sensitive user information) without either Alice or the Cyph administrators noticing.

As described in further detail below, the system and method described here uses cryptographic signing to verify the integrity of any application payload delivered over the Internet on the client-side, allowing Alice to know with certainty that the code her browser is executing was directly approved by an administrator of that application. Additionally, the embodiments herein are simple, in addition to being more secure and convenient, to implement compared to conventional encrypted delivery systems Referring now to the drawings, and more particularly to FIGS. 1 through 3, where similar reference characters denote corresponding features consistently throughout the figures, there are shown preferred embodiments.

Figure 1B:
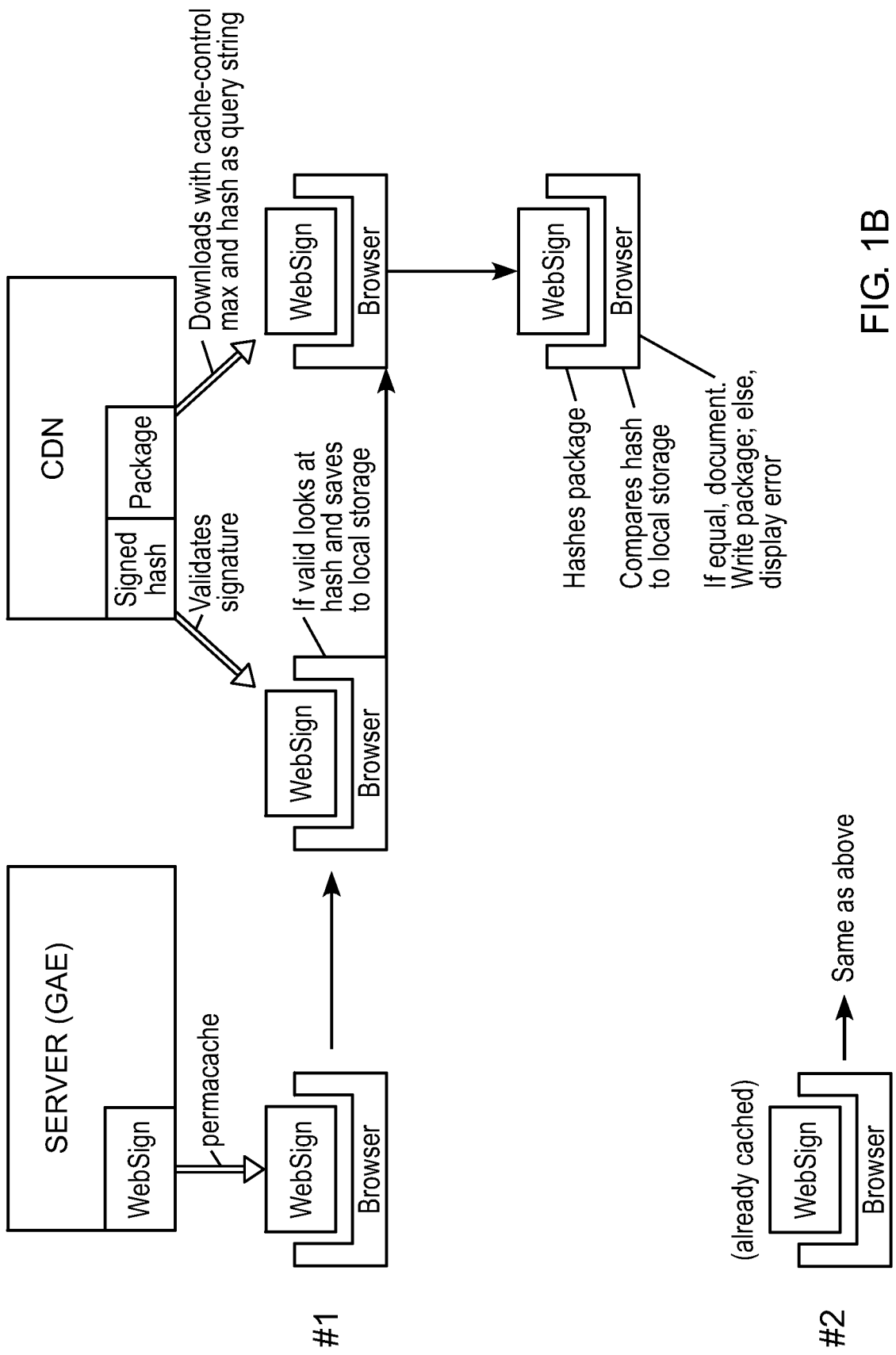

FIGS. 1A and 1B illustrate a flow diagram illustrating a method 1 of cryptographically signing web applications according to an embodiment herein. As shown in FIG. 1A, in step 10, When a user (i.e., Alice) navigates to the application's Web address (e.g., Cyph web address), instead of the server delivering the application itself, the server delivers a minimal bootstrap payload. The minimal bootstrap payload ("MBP") is stored locally for as long as the client will allow (preferably the MBP is stored indefinitely). According to embodiments herein, the MBP is locally stored using methods that include HTML5 AppCache or HTTP Cache-Control headers. Moreover, according to one embodiment herein, the MBP includes at least one public key and at least one URL pointing to the latest application code payload. According to one embodiment herein, the application code payload includes any combination of HyperText Markup Language (HTML), Cascading Style Sheets (CSS) and JavaScript (JS) (collectively known as HTML/CSS/JS), Android application package ("APK") and the like. Embodiments described herein, however, are not limited to such MBP and application code payloads. Rather the bootstrap and/or application code payloads described herein broadly includes any browser-supported programming language that support local caching.

According to step 20, because the MBP has been cached locally, every time the user opens the application's web address, the MBP is what will be executed by the user's browser instead of what is delivered by the application's web address. Moreover, according to step 30, the first step of the MBP is to download the latest version of the application code from a URL specified in the MBP's configuration. The application code targeted by that URL has previously been cryptographically signed using a private key associated with a public key specified in the bootstrap payload's configuration. In step 40, the MBP then validates the cryptographic signature included with the application code. If this is successful, the application code is executed normally. If it fails, the code is rejected. According to one embodiment herein, however, a previous known good version may be optionally executed from local storage/cache, if such a copy exists.

As a result of the method shown in FIG. 1A, all versions of the application run on a user's browser after the initial MBP was downloaded is cryptographically secure and validated, assuming the initial MBP was valid and untampered.

In addition to what is described above and shown in FIG. 1A, other embodiments optionally may include several optimizations. For example, embodiments described herein may cache the latest known good version of the application code locally, both for performance reasons (to grab it from the cache in the event that it hasn't changed) and to fall back on in the event that verification of the application code ever fails in the future. Additionally, embodiments herein may further include at least one URL pointing to a pre-computed hash of the latest application code in the bootstrap payload, and cryptographically sign those hashes instead of the application payloads themselves (such that the client need only download a fresh copy of the hash to check for updates, rather than the entire application). According to such an embodiment, the bootstrap payload would then locally hash the unsigned application code and compare the result to the signed hash in order to verify the application's integrity.

Additionally, as method 1 shown in FIG. 1A specifies "at least one URL" for the application code and hash, the bootstrap payload could optionally retry the download and verification steps with backup servers in the event that it fails on the first one (providing some additional reliability to the system), and/or default to the geographically closest servers for performance reasons. Moreover, as method 1 shown in FIG. 1A specifies "at least one public key", the bootstrap payload could optionally attempt to validate the signatures against more than one individual or organization's public key. Such an embodiment could potentially be evidence of a specific individual or organization negligence or malfeasance in the event that any particular version of the application code is later discovered to be malicious. Additionally, some programmatic environments permit to a local cache wipe remotely from a server (e.g., HTML5 AppCache). To prevent such a local cache wipe from a server, embodiments described herein may also include, in the MBP, detection of an attempt to local cache wipe from the server and warn the user (e.g., by displaying a warning dialog box in the user's browser).

FIG. 1B illustrates a schematic diagram illustrating cryptographically signing web applications according to an embodiment herein. As shown FIG. 1B, From a CDN node on the client's current continent, download the latest signed hash and attempt to validate the signatures. If the following conditions are met, replace signature data in local storage with the new data: i) Signature verification was successful; ii) Hash expiration date has not been passed; iii) Hash timestamp is more recent than local known good hash timestamp; iv) User either does not have localStorage.webSignManualUpgrades set or consents to upgrade. Otherwise: leave local storage as-is. Moreover, if known good signature data exists in local storage: a) Download the current WebSign bootstrap, hash it with SHA256, and validate the hash against the whitelist from the local signature data; if there's no match, abort everything, panic, and show a warning message informing the user not to refresh or use Cyph again; b) Validate that known good package hash isn't expired; c) Download the package from the CDN, with the query string set to the hash as a caching optimization; d) Compute SHA256 hash of package and compare it to known good package hash; if equal, execute the package via document.write. If no known good signature data exists in local storage, or if the above steps fail, retry against the default fallback continent (e.g., Europe). If that still fails, display, for example "Loading Cyph failed. Please try again later." In addition, while not shown in FIG. 1B, For all WebSign bootstrap files according to one embodiment (including the AppCache manifest), apply: HTML AppCache; ServiceWorker; HTTP CacheControl public with max-age 1 year; HTTP Expires for December 2037. While a single combined payload may be offer the simplest approach, it is certainly possible to split the code into multiple files. In this case, additional verification logic is needed in the bootstrap payload described above (e.g., via separate signatures) or in the signed application code (e.g., via pre-compute hashes)—potentially taking advantage of the upcoming Subresource Integrity standard of the World Wide Web Consortium (W3C). Additionally, for defense in depth, a server-side HPKP key rotation scheme is employed wherein TLS keys pinned in the users' browsers are periodically deleted and invalidated, thus explicitly denying availability of our hostname after the first use, and forcing browsers to continue relying on the WebSign code they'd originally cached.

Figure 2:
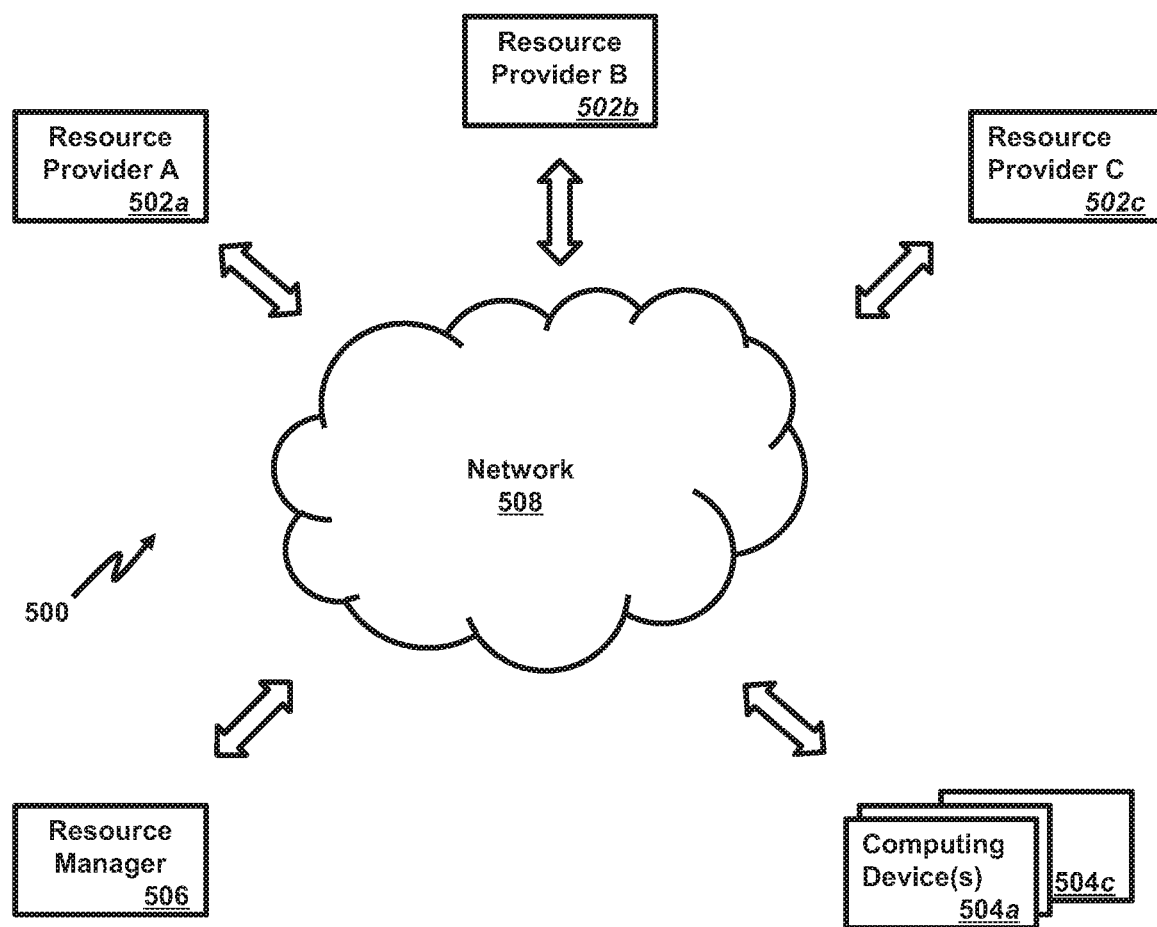
FIG. 2 illustrates a schematic diagram of a network architecture used in accordance with the embodiments herein.

FIG. 2 illustrates an implementation of an exemplary networking environment (e.g., cloud computing environment 500) for the embodiments described herein is shown and described. The cloud computing environment 500 may include one or more resource providers 502 a, 502 b, 502 c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504 a, 504 b, 504 c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
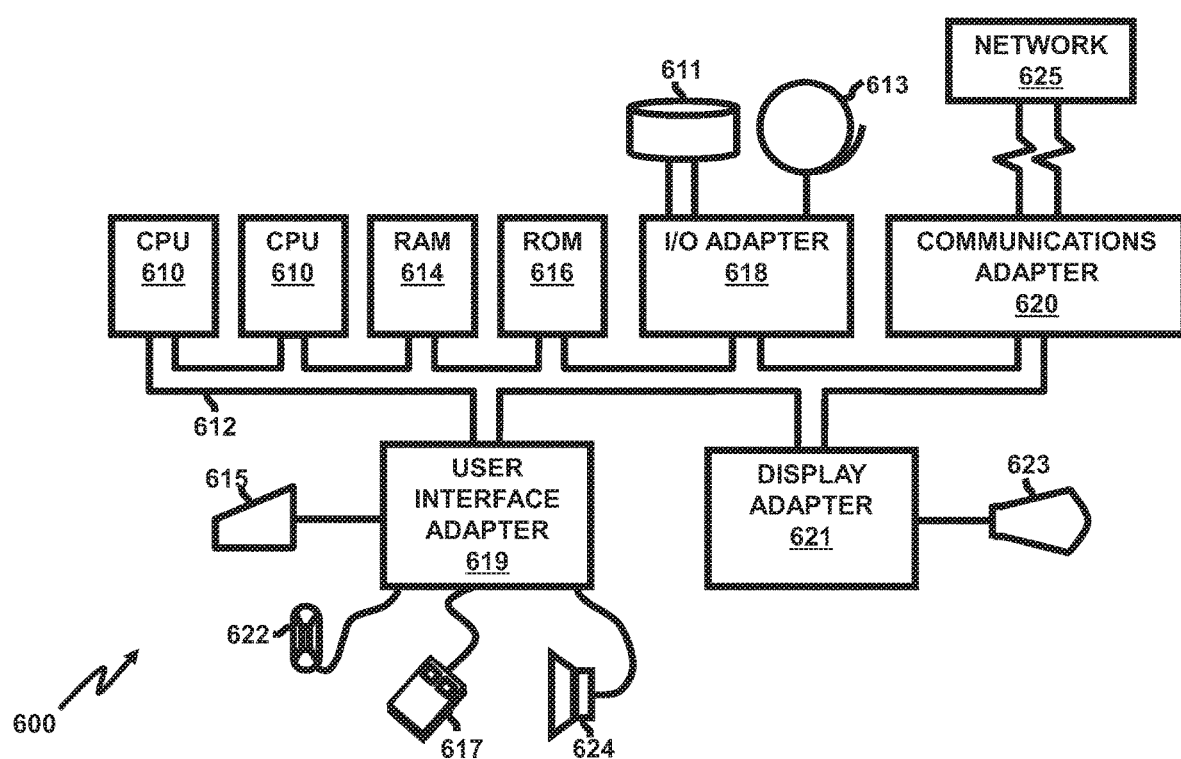
FIG. 3 illustrates a schematic diagram of a computer architecture used in accordance with the embodiments herein.

A representative hardware environment for practicing the embodiments herein is depicted in FIG. 3. This schematic drawing illustrates a hardware configuration of an information handling/computer system 600 in accordance with the embodiments herein. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments herein. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

For example, FIG. 3 includes exemplary embodiments of a computing device and a mobile computing device that can be used to implement the techniques described in this disclosure. As a computing device, system 600 is intended to represent various forms of digital computers, such as laptops, desktops, workstations, personal digital assistants, servers, blade servers, mainframes, and other appropriate computers. As a mobile computing device, system 600 is intended to represent various forms of mobile devices, such as personal digital assistants, cellular telephones, smartphones, and other similar computing devices. The components shown here, their connections and relationships, and their functions, are meant to be examples only, and are not meant to be limiting.

Thus, as a computing device, system 600 includes a processor (e.g., CPUs 610), a memory 614, storage units (e.g., ROM 616, disk units 611, tape drives 613), a high-speed interface 618 connecting to the memory 614 and multiple high-speed expansion ports 619, and a low-speed interface (not shown) connecting to a low-speed expansion port (not shown) and a storage device. Each of the processors, the memory 614, the storage device, the high-speed interface 618, the high-speed expansion ports 619, and the low-speed interface, are interconnected using various busses (e.g., bus 612), and may be mounted on a common motherboard or in other manners as appropriate. The processor can process instructions for execution within the computing device, including instructions stored in the memory 614 or on the storage device to display graphical information for a GUI on an external input/output device, such as a display 623 coupled to the high-speed interface 619. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 614 stores information within the computing device. In some implementations, the memory 614 is a volatile memory unit or units. In some implementations, the memory 614 is a non-volatile memory unit or units. The memory 614 may also be another form of computer-readable medium, such as a magnetic or optical disk.

The storage device is capable of providing mass storage for the computing device. In some implementations, the storage device may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor), perform one or more methods, such as those described above. The instructions can also be stored by one or more storage devices such as computer- or machine-readable mediums (for example, the memory 614, the storage device, or memory on the processor).

The high-speed interface 618 manages bandwidth-intensive operations for the computing device, while the low-speed interface manages lower bandwidth-intensive operations. Such allocation of functions is an example only. In some implementations, the high-speed interface 618 is coupled to the memory 614, the display 623 (e.g., through a graphics processor or accelerator), and to the high-speed expansion ports 619, which may accept various expansion cards (not shown). In the implementation, the low-speed interface is coupled to the storage device and the low-speed expansion port. The low-speed expansion port, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms, as shown in the figure. For example, it may be implemented as a standard server, or multiple times in a group of such servers. In addition, it may be implemented in a personal computer such as a laptop computer. It may also be implemented as part of a rack server system. Alternatively, components from the computing device may be combined with other components in a mobile device (not shown), such as a mobile computing device. Each of such devices may contain one or more of the computing device and the mobile computing device, and an entire system may be made up of multiple computing devices communicating with each other.

As a mobile computing device, system 600 includes a processor (e.g., CPUs 610), a memory 614, an input/output device such as a display 623, a communication interface 620, and a transceiver (not shown), among other components. The mobile computing device may also be provided with a storage device, such as a micro-drive or other device, to provide additional storage. Each of the processor, the memory 614, the display 623, the communication interface 620, and the transceiver, are interconnected using various buses (e.g., bus 612), and several of the components may be mounted on a common motherboard or in other manners as appropriate.

The processor can execute instructions within the mobile computing device, including instructions stored in the memory 614. The processor may be implemented as a chipset of chips that include separate and multiple analog and digital processors. The processor may provide, for example, for coordination of the other components of the mobile computing device, such as control of user interfaces, applications run by the mobile computing device, and wireless communication by the mobile computing device.

The processor may communicate with a user through a control interface 619 and a display interface (not shown) coupled to the display 623. The display 623 may be, for example, a TFT (Thin-Film-Transistor Liquid Crystal Display) display or an OLED (Organic Light Emitting Diode) display, or other appropriate display technology. The display interface may comprise appropriate circuitry for driving the display 623 to present graphical and other information to a user. The control interface 619 may receive commands from a user and convert them for submission to the processor. In addition, an external interface (not shown) may provide communication with the processor, so as to enable near area communication of the mobile computing device with other devices. The external interface may provide, for example, for wired communication in some implementations, or for wireless communication in other implementations, and multiple interfaces may also be used.

The memory 614 stores information within the mobile computing device. The memory 614 can be implemented as one or more of a computer-readable medium or media, a volatile memory unit or units, or a non-volatile memory unit or units. An expansion memory (not shown) may also be provided and connected to the mobile computing device through an expansion interface (not shown), which may include, for example, a SIMM (Single In Line Memory Module) card interface. The expansion memory may provide extra storage space for the mobile computing device, or may also store applications or other information for the mobile computing device. Specifically, the expansion memory may include instructions to carry out or supplement the processes described above, and may include secure information also. Thus, for example, the expansion memory may be provide as a security module for the mobile computing device, and may be programmed with instructions that permit secure use of the mobile computing device. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor), perform one or more methods, such as those described above. The instructions can also be stored by one or more storage devices, such as one or more computer- or machine-readable mediums (for example, the memory 614, the expansion memory, or memory on the processor). In some implementations, the instructions can be received in a propagated signal, for example, over the transceiver or the external interface.

The mobile computing device may communicate wirelessly through the communication interface 620, which may include digital signal processing circuitry where necessary. The communication interface 620 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver using a radio-frequency. In addition, short-range communication may occur, such as using a Bluetooth®, Wi-Fi™, or other such transceiver (not shown). In addition, a GPS (Global Positioning System) receiver module (not shown) may provide additional navigation- and location-related wireless data to the mobile computing device, which may be used as appropriate by applications running on the mobile computing device.

The mobile computing device may also communicate audibly using an audio codec, which may receive spoken information from a user and convert it to usable digital information. The audio codec may likewise generate audible sound for a user, such as through a speaker (e.g., speaker 612 or in a handset of the mobile computing device). Such sound may include sound from voice telephone calls, may include recorded sound (e.g., voice messages, music files, etc.) and may also include sound generated by applications operating on the mobile computing device.

The mobile computing device may be implemented in a number of different forms, as shown in the figure. For example, it may be implemented as a cellular telephone (not shown). It may also be implemented as part of a smartphone, personal digital assistant, or other similar mobile device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method, comprising:
   receiving, at a client-side web browser, a minimal bootstrap payload from an application server;
   storing, by a client-side processor, the minimal bootstrap payload in a client-side local cache, wherein
   the client-side local cache comprises a locally stored public key previously received by the application server and stored in the client-side local cache by the client-side processor;
   the locally cached minimal bootstrap payload is executed by the client-side processor before executing an application from the application server;
   the minimal bootstrap payload includes at least one public key and at least one Uniform Resource Location (URL) address of an application code payload;
   the client-side processor executes the minimal bootstrap payload, wherein executing the minimal bootstrap payload comprises:
   receiving, at the client-side web browser, the application code payload from the URL specified by the minimal bootstrap payload;
   verifying, by the client-side processor, the received application code payload;
   executing, by the client-side processor, the received application code payload after the received application payload has been successfully verified.

2. The method of claim 1, wherein the minimal bootstrap payload further comprises:
   storing, by the client-side processor, in the client-side local cache a copy of the verified application code payload; and
   executing the client-side local cache copy of the verified application code payload when the minimal bootstrap payload fails to verify the received application code payload.

3. The method of claim 1, wherein at least one of the minimal bootstrap payload and the application code payload are written using a combination of HyperText Markup Language (HTML), Cascading Style Sheets (CSS) and JavaScript (JS).

4. The method of claim 1, wherein the minimal bootstrap payload includes a backup URL and further comprises receiving a backup application code payload from a backup URL when the minimal bootstrap payload fails to verify the received application code payload.

5. The method of claim 1, wherein the minimal bootstrap payload includes at least two public keys and further comprises verifying, by the client-side processor, the received application code payload.

6. The method of claim 1, wherein the minimal bootstrap payload includes a second URL and further comprises:
   receiving a pre-computed hash from the second URL,
   verifying, by the client-side processor, the received pre-computed hash has using the locally stored public key; and
   storing, by the client-side processor, in the client-side local cache a copy of the verified pre-computed hash.

7. The method of claim 6, wherein the minimal bootstrap payload further comprises computing, by the client-side processor, a hash of the received application code payload.

8. The method of claim 7, wherein the minimal bootstrap payload further comprises comparing the computed hash of the received application code payload with the client-side local cache a copy of the verified pre-computed hash.

9. A non-transitory computer readable medium, instructing an computing device to execute a method comprising:
   receiving, at a client-side web browser, a minimal bootstrap payload from an application server;
   storing, by a client-side processor, the minimal bootstrap payload in a client-side local cache, wherein
   the client-side local cache comprises a locally stored public key previously received by the application server and stored in the client-side local cache by the client-side processor;
   the locally cached minimal bootstrap payload is executed by the client-side processor before executing an application from the application server;
   the minimal bootstrap payload includes at least one public key and at least one Uniform Resource Location (URL) address of an application code payload;
   the client-side processor executes the minimal bootstrap payload, wherein executing the minimal bootstrap payload comprises:
   receiving, at the client-side web browser, the application code payload from the URL specified by the minimal bootstrap payload;
   verifying, by the client-side processor, the received application code payload;
   executing, by the client-side processor, the received application code payload after the received application payload has been successfully verified.

10. The computer readable medium of claim 9, wherein the minimal bootstrap payload further comprises:
   storing, by the client-side processor, in the client-side local cache a copy of the verified application code payload; and
   executing the client-side local cache copy of the verified application code payload when the minimal bootstrap payload fails to verify the received application code payload.

11. The computer readable medium of claim 9, wherein at least one of the minimal bootstrap payload and the application code payload are written using a combination of HyperText Markup Language (HTML), Cascading Style Sheets (CSS) and JavaScript (JS).

12. The computer readable medium of claim 9, wherein the minimal bootstrap payload includes a backup URL and further comprises receiving a backup application code payload from a backup URL when the minimal bootstrap payload fails to verify the received application code payload.

13. The computer readable medium of claim 9, wherein the minimal bootstrap payload includes at least two public keys and further comprises verifying, by the client-side processor, the received application code payload cryptographic signature using the locally stored public keys.

14. The computer readable medium of claim 9, wherein the minimal bootstrap payload includes a second URL and further comprises:
   receiving a pre-computed hash from the second URL,
   verifying, by the client-side processor, the received pre-computed hash has using the locally stored public key; and
   storing, by the client-side processor, in the client-side local cache a copy of the verified pre-computed hash.

15. The computer readable medium of claim 14, wherein the minimal bootstrap payload further comprises computing, by the client-side processor, a hash of the received application code payload.

16. The computer readable medium of claim 15, wherein the minimal bootstrap payload further comprises comparing the computed hash of the received application code payload with the client-side local cache a copy of the verified pre-computed hash.

* * * * *